3,010,959
16-LOWER ALKYL-17-ALKYNYL-
TESTOSTERONES
Eugene P. Oliveto, Bloomfield, and Richard Rausser,
Union, N.J., assignors to Schering Corporation, Bloomfield, N.J., a corporation of New Jersey
No Drawing. Filed Nov. 26, 1958, Ser. No. 776,447
6 Claims. (Cl. 260—239.55)

This invention relates to a new group of therapeutically active steroid compounds. More particularly, the invention relates to certain 17α-alkynyl-16-lower alkyl-androstadienes and intermediates leading thereto, and to methods for their manufacture.

The novel compounds of the present invention may be represented by the following formula:

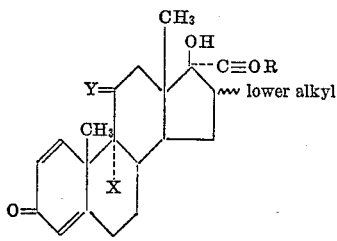

wherein X is a member of the group consisting of H and halogen having an atomic weight less than 100; Y is a member of the group consisting of O and (H, βOH); R is a member of the group consisting of H and lower alkyl, and the term "lower alkyl" stands for an α or β alkyl group having up to four carbon atoms; and the 1,2-dihydro analogs thereof.

In the above formula and throughout the instant application, a bond designated as "ʄ" signifies that the substituents attached to such a bond have either an α or β configuration.

Valuable intermediates useful in the preparation of the above compounds are those having the formula and designation shown above except that X and Y together represent a 9β,11β-oxido group.

The preferred final compounds of our invention are those wherein X is halogen and R is hydrogen, and in particular, 9α-fluoro-16-methyl-(α or β)-17α-ethinyl-1,4-androstadiene-11β,17β-diol-3-one.

It has been found that the 1,4-diene compounds of this invention, especially the 9α-fluoro, are potent anti-inflammatory agents possessing a degree of catabolic and anti-anabolic activities. While being essentially free of androgenic and salt retaining effects, our compounds are indicated for use in conditions such as arthritis where anti-inflammatory and anti-anabolic agents have been employed and certain syndromes such as Paget's disease of bone.

The presence of the alkyl group, especially methyl, in the 16-position potentiates the activity of the substance and provides for a more favorable thereapeutic ratio. Similar anti-inflammatory properties are exhibited by the Δ4-monoenes, however, their principal use is as intermediates for the manufacture of the more potent and advantageously employed 1,4-dienes.

The therapeutically active compounds are preferably administered orally in the form of tablets. For example, a tablet composed of about 10 to 50 mg. of 9α-fluoro-16-(α or β)-methyl-17α-ethinyl-1,4-androstadiene-11β,17β-diol-3-one in admixture with a mixed solid carrier containing one or more of the usual ingredients, such as starch, sugar, gums, clays and the like provides a usable pharmaceutical dosage form which can be administered 3 to 4 times daily. Other dosage forms such as solutions, elixirs, and the like also lend themselves to such administration.

The therapeutically valuable compounds of our invention are prepared by a number of easily effected transformations. For example, in the manner described in our co-pending application, Serial No. 776,446, filed November 26, 1958, the 16-alkyl-17-keto-1,4-androstadienes are obtained by the oxidative degradation of an appropriately substituted pregnadiene by means of sodium bismuthate. (The 16-alkyl-pregnadiene starting compounds are prepared according to the procedure described in co-pending application of Rausser et al., Serial No. 733,843 filed on May 8, 1958.) The 16-alkyl-17-keto-1,4-androstadienes are then alkynated in the conventional manner, such as with acetylene and potassium in anhydrous ether, or sodamide in liquid ammonia or lithium acetylide. In carrying out the alkynation, it is often desirable to protect the 3-keto group in the A-ring by the formation of a pyrrolidyl enamine or ethylene ketal derivative in order to increase yields and obtain purer products. Thus, the oxidation of 9α-fluoro-16α-methyl-1,4-pregnadiene-11β,17α,21-triol-3,20-dione with sodium bismuthate in acetic acid yields 9α-fluoro-16α-methyl-1,4-androstadiene-11β-ol-3,17-dione. Ethynation with potassium in anhydrous ether yields 9α-fluoro-16α-methyl-17α-ethinyl-1,4-androstadiene-11β,17β-diol-3-one.

While the degradation of the C-21 steroids is customarily carried out in aqueous acetic acid, other water miscible fatty acids such as propionic acid can be used. Likewise, other oxidizing agents may be used in place of sodium bismuthate, such as lead tetraacetate, periodic acid or chromic acid. With chromic acid, however, an 11β-hydroxyl group, if present, will be oxidized to an 11-ketone.

In the foregoing process, the substitution of potassium methyl-acetylide (or other alkali metal methyl-acetylide) for potassium acetylide yields a 17α(methyl-ethinyl)-17β-hydroxy-unsaturated androstane. Similarly, other potassium (or other alkali metal) alkyl-substituted acetylides may be used in the above process for example, potassium ethyl-, propyl-, isopropyl-, butyl-, isobutyl-, and tertiary butylacetylide, to yield the corresponding 17α-alkylethinyl-17β-hydroxy-unsaturated androstane.

The oxidative degradation described above is also applicable to 16-alkylated-4-pregnenes whose preparation is described in the co-pending Rausser et al. application supra. The Δ1-bond can be introduced at any stage by means of any of several methods known in the art. We prefer to employ microbiological dehydrogenation techniques such as use of Corynebacterium simplex described in U. S. Patent No. 2,837,464.

By our process, a 16-alkylated-4-pregnene such as 16α-methyl-cortisone when oxidized with sodium bismuthate yields 16α-methyl-4-androstene-3,11,17-trione. Reaction with acetylene in anhydrous ether in the presence of potassium yields 16α-methyl-17α-ethinyl-4-androstene-17β-ol-3,11-dione. To obtain the corresponding 1,4-androstadiene, 16α-methyl-17α-ethinyl-4-androstene-17β-ol-3,11-dione is subjected to the action of a culture Corynebacterium simplex to give 16α-methyl-17α-ethinyl-1,4-androstadiene-17β-ol-3,11-dione. Alternatively, the diene may be obtained by dehydrogenating 16α-methyl-4-androstene-3,11,17-trione by means of selenium dioxide for example, to give 16α-methyl-1,4-androstadiene-3,11,17-trione which is ethynated in the aforementioned manner to give the desired 16α-methyl-17α-ethinyl-1,4-androstadiene-3,11,17-trione.

Similarly, there may be obtained 16α-methyl-17α-methylethinyl-4-androstene-17β-ol-3,11-dione from 16α-methylcortisone by first oxidizing the cortisone analog with sodium bismuthate to 16α-methyl-4-androstene-3,11,20-trione, which is then reacted with methylacetylene and potassium in ether to give 16α-methyl-17α-methylethinyl-4-androstene-17β-ol-3,11-dione.

The oxidative degradation is also applicable to nonhalogenated pregnene and pregnadiene precursors giving rise to a 16-alkyl-1,4-androstadiene-11 - oxy-3,17-dione. In this instance, the 9α-halogeno group and the 17-alkynyl group can be sequentially introduced. We prefer to prepare the 9α-halogeno compounds of our invention from a 9β,11β-oxido precursor such as 16α-methyl-9β,11β-oxido-1,4-androstadiene-3,17-dione or its 1,2-dihydro analog. These oxido compounds are prepared as described in our co-pending application Serial No. 776,446, filed November 26, 1958, by the action of sodium bismuthate or chromic acid on a 16-alkyl-9β,11β-oxido-1,4 - pregnadiene-17α,21-diol-3,20-dione. Alkynation of the 17-keto group as described heretofore, and opening the epoxide ring in the conventional manner gives rise to the novel halogenated compounds of this invention. For example, to obtain 9α-fluoro-16α-methyl-17α-ethinyl-1,4-androstadiene, there is first prepared the appropriately substituted 9β,11β-oxido compound in the following manner. 16α-methylhydrocortisone 21-acetate is dehydrated by means of benzenesulfonyl chloride to give 16α-methyl-4,9-pregnadiene-17α,21-diol-3,20-dione 21-acetate which is reacted with N-bromoacetamide and perchloric acid, for example, to give 9α-bromo-16α-methylhydrocortisone 21-acetate. The 9α-bromo compound is refluxed in methanol in the presence of potassium acetate to obtain 9β,11β-oxido-16α-methyl-4-pregnene-17α,21 - diol-3,20 - dione 21-acetate. Hydrolysis of the 9β,11β-oxido pregnene 21-acetate to the 9β,11β-oxido pregnene 21-alcohol followed by the action of sodium bismuthate yields 9β,11β-oxido-16α-methyl-4-androstene-3,17-dione. The 9β,11β-oxido androstene is converted to the corresponding 17-ethinyl compound by first forming a 3-pyrrolidyl enamine and then ethinating and hydrolyzing the 3-pyrrolidyl enamine to give 16α-methyl-17α-ethinyl-9β,11β-oxido-4-androstene - 17β-ol-3-one. Upon reaction of the oxido compound with anhydrous hydrogen fluoride there is obtained 9α-fluoro-16α-methyl-17α-ethinyl-4 - androstene - 11β,17β-diol-3-one which is dehydrogenated to the 1-dehydro analog by the action of *Corynebacterium simplex*.

Similarly, the 9α-chloro or 9α-bromo analogs of the above 4-androstene are obtained from 16α-methyl-17α-ethinyl-9β,11β-oxido-4-androstene-17β-ol-3-one by the action of anhydrous hydrogen chloride and anhydrous hydrogen bromide, respectively.

The following examples are illustrative of our invention and are not to be construed as limiting the scope thereof.

EXAMPLE 1

*16α-methyl-17α-ethinyl-9β,11β-oxido-4-androstene-17β-ol-3-one*

The requisite intermediates are prepared as follows:

A. *16α - methyl-4,9-pregnadiene-17α,21-diol-3,20-dione 21-acetate.*—To a solution of 16α-methylhydrocortisone 21-acetate (0.3 g.), in 5 ml. of pyridine there is added 0.2 ml. of benzenesulfonyl chloride in 3 ml. of pyridine. The solution is allowed to stand for 4 hours, then is poured into ice and hydrochloric acid. A solid precipitates which is filtered and crystallized from acetone-hexane to give 16α-methyl-4,9-pregnadiene-17α,21-diol-3,20-dione 21-acetate, $$\lambda_{max.}^{MeOH} \ 239 \ m\mu \ (\epsilon 16,020)$$

B. *9α-bromo-16α-methylhydrocortisone 21 - acetate.*—To 0.2 g. of the 16α-methyl-4,9-pregnadiene prepared above in 20 ml. of purified dioxane there is added 2 ml. of water containing 0.1 g. of N-bromoacetamide and 1 ml. of 1.5 N-perchloric acid. The resultant suspension is gently agitated for two hours, during which time the mixture becomes homogeneous. A solution of 0.2 g. of sodium sulfite in 2 ml. of water is then added, and the solution extracted with methylene chloride. The organic extracts are combined, washed with water, dried and evaporated to a solid residue which is crystallized from acetone to give 9α-bromo-16α-methylhydrocortisone 21-acetate, $$\lambda_{max.}^{MeOH} \ 243 \ m\mu \ (\epsilon 16,100)$$

C. *9α-bromo-16α-methylhydrocortisone.*—To 0.5 g. of 9α-bromo-16α-methylhydrocortisone 21-acetate in 100 ml. of methanol and 20 ml. of chloroform there is added 5 ml. of water and 5 ml. of concentrated hydrochloric acid. The reaction mixture is allowed to stand 48 hours at room temperature at which time water is added, and the mixture extracted with methylene chloride. The organic extracts are combined, washed with water, dried and concentrated to a residue. Crystallization of this residue from acetone yields 9α-bromo-16α-methylhydrocortisone.

D. *9β,11β - oxido - 16α-methyl-4-pregnene-17α,21-diol-3,20-dione 21-acetate.*—To 9α-bromo-16α-methylhydrocortisone 21-acetate of Example 1B (0.3 g.), in 20 ml. of methanol there is added 0.3 g. of potassium acetate. The mixture is refluxed for 2 hours, then concentrated in vacuo to a residue. Water is added to the residue, and a solid separates which is filtered and crystallized from methanol-water to give 0.1 g. of 9β,11β-oxido-16α-methyl-4-pregnene-17α,21-diol-3,20-dione 21-acetate.

E. *9β,11β-oxido-16α-methyl-4-androstene-3,17-dione.*—A solution of 5.0 g. of 9β,11β-oxido-16α-methyl-4-pregnene-17α,21-diol-3,20-dione 21-acetate in 20 ml. of methanol and 5 ml. of water containing 2.5 g. of sodium bicarbonate is refluxed for ½ hour. The methanol is removed by distillation and water added to precipitate 9β,11β - oxido - 16α-methyl-4-pregnene-17α,21-diol-3,20-dione.

To 2 g. of the oxido-pregnene-21-ol prepared above in 200 ml. of acetic acid there is added 200 ml. of water containing 35 g. of sodium bismuthate, and the mixture is stirred overnight at room temperature. The solid is removed by filtration and washed with methylene chloride. The filtrate is further diluted with water and extracted with methylene chloride. The organic layer is washed neutral with sodium bicarbonate solution, then water, dried and evaporated to a residue. Crystallization of this residue from methanol-water gives 1.0 g. of 9β,11β-oxido-16α-methyl-4-androstene-3,17-dione.

F. *3 - pyrrolidino-9β,11β-oxido-16α-methyl-3,5-androstadiene-17-one.*—Three grams of the product of Example 1E is suspended in 10 ml. of methanol, and nitrogen bubbled through the mixture. The mixture is heated to boiling, then 1.0 g. of pyrrolidine is added and the heating continued until crystals appear (5–10 min.). Upon cooling and filtering, 2.1 g. of 3-pyrrolidino-9β,11β-oxido-16α-methyl-3,5-androstadiene-17-one is obtained.

G. *16α - methyl-17α-ethinyl-9β,11β-oxido-4-androstene-17β-ol-3-one.*—A solution of 200 mg. of potassium in 20 ml. of redistilled t-amyl alcohol is added dropwise with stirring to a solution of 100 ml. of anhydrous ether saturated with acetylene. After five minutes of stirring, a solution of 1.5 g. of 3-pyrrolidino-9β,11β-oxido-16α-methyl-3,5-androstadiene-17-one in 150 ml. of anhydrous ether is added dropwise over 1 hour. Acetylene is bubbled through the stirred mixture during the addition of the oxido-androstadiene and this is continued for 2 hours longer. Dilute acetic acid is then added cautiously and the mixture boiled for 10 minutes, then extracted with ether. The ether solution is washed to neutrality with sodium bicarbonate solution and water, dried and evaporated to a residue which is crystallized from acetone-hexane to yield 16α-methyl-17α-ethinyl-9β,11β-oxido-4-androstene 17β-ol-3-one.

The ethinyl compound of this example is also prepared from the oxido intermediate of Example 1E by ethinating directly as described in Example 1G.

Similarly, by starting with the 16β-methyl epimer and applying the foregoing procedure there is obtained 16β-methyl - 17α - ethinyl-9β,11β-oxido-4-androstene-17β-ol-3-one.

EXAMPLE 2

*16α-methyl-17α-ethinyl-4-androstene-11β,17β-diol-3-one*

A. *16α-methyl-4-androstene-11β-ol-3,17-dione.*—A solution of 3 g. of 16α-methylhydrocortisone in 300 ml. of acetic acid and 300 ml. of water containing 50 g. of sodium bismuthate is stirred at room temperature overnight. The undissolved solid is removed by filtration and washed with methylene chloride. The filtrate is further diluted with water and extracted with methylene chloride. The organic layer is separated and washed neutral with sodium bicarbonate solution, then water, dried and evaporated to a residue. The residue is crystallized from methanol-water yielding 16α-methyl-4-androstene-11β-ol-3,17-dione.

B. *16α-methyl-17α-ethinyl-4-androstene-11β,17β-diol-3-one.*—The 17-keto-androstene prepared as in Example 2A is reacted with acetylene as described in Example 1G, and the resultant product isolated and purified in the described manner to give 16α-methyl-17α-ethinyl-4-androstene-11β,17β-diol-3-one.

EXAMPLE 3

*16β-methyl-17α-ethinyl-4-androstene-11β,17β-diol-3-one*

16β-methylhydrocortisone is reacted according to a procedure analogous to Example 2, and there is obtained 16β-methyl-17α-ethinyl-4-androstene-11β,17β-diol-3-one.

EXAMPLE 4

*16α-methyl-17α-ethinyl-4-androstene-17β-ol-3,11-dione*

16α-methylcortisone is oxidized according to the analogous procedure of Example 2 yielding 16α-methyl-4-androstene-3,11,17-trione which is then ethinated as therein described to give 16α-methyl-17α-ethinyl-4-androstene-17β-ol-3,11-dione Similarly, 16β-methyl-17α-ethinyl-4-androstene-17β-ol-3,11-dione is prepared from 16β-methylcortisone.

EXAMPLE 5

*16α-methyl-17α-ethinyl-9β,11β-oxido-1,4-androstadiene-17β-ol-3-one*

The 21-acetate of 16α-methylprednisolone, is subjected to the reaction sequence described in Example 1, to obtain 16α-methyl-17α-ethinyl-1,4-androstadiene-17β-ol-3-one.

Similarly, 16β-methylprednisolone is converted by this procedure to 16β - methyl - 17α-ethinyl-9β,11β-oxido-1,4-androstadiene-17β-ol-3-one.

Alternatively, the 1,4-androstadienes and 1,4-pregnadienes of this example are prepared from the corresponding 4-androstenes and 4-pregnenes of Example 1 by introduction of a Δ¹-double bond at any point in the procedure by known chemical or microbiological procedures. Thus, subjecting 16-methyl(α or β)-17α-ethinyl-19β,11β-oxido-4-androstene-17β-ol-3-one to the microbiological dehydrogenating action of *Corynebacterium simplex* according to analogous procedures described in U.S. Patent No. 2,837,464 there is obtained the corresponding 1,4-androstadiene.

Alternatively, 9α-bromo-16α-methyl-hydrocortisone 21-acetate of Example 1B is converted by the action of *Corynebacterium simplex* to 9α-bromo-16α-methylprednisolone 21-acetate, which is then subjected to procedures analogous to Example 1D through 1G to give 16α-methyl-17α-ethinyl-9β,11β-oxido-1,4-androstadienes - 17β - ol-3-one.

EXAMPLE 6

*16α-methyl-17α-ethinyl-1,4-androstadiene-11β,17β-diol-3-one*

A. *16α-methyl-1,4-androstadiene-11β-ol-3,17-dione.* — By substituting 16α-methylprednisolone for 16α-methylhydrocortisone in the procedure of Example 2A there is obtained 16α-methyl-1,4-androstadiene-11β-ol-3,17-dione.

B. *16α-methyl-17α - ethinyl - 1,4 - androstadiene - 11β, 17β-diol-3-one.*—The 16α-methylandrostadiene of Example 6A is reacted with acetylene in the manner of Example 2B to give 16α-methyl-17α-ethinyl-1,4-androstadiene-11β,17β-diol-3-one.

Alternatively, the 17α-ethinyl-androstadiene of this example may be prepared from the 17α-ethinyl-androstene of Example 2 by microbiological dehydrogenation of said androstene, according to the analogous procedure described in U.S. Patent No. 2,837,464.

By using the procedures of Examples 6A and 6B, 16β-methylprednisolone is converted to the 16β-methyl epimer of the compound of this example, namely, 16β-methyl-17α-ethinyl-1,4-androstadiene - 11β,17β - diol - 3-one.

EXAMPLE 7

*16α-methyl-17α-ethinyl-1,4-androstadiene-17β-ol-3,11-dione*

16α-methylprednisone is reacted in the manner of Example 4 to give 16α-methyl-17α-ethinyl-1,4-androstadiene-17β-ol-3,11-dione. In similar fashion, the 16β-methyl epimer is obtained by subjecting 16β-methylprednisone to the procedure of Example 4.

EXAMPLE 8

*9α-fluoro-16α-methyl-17α-ethinyl-4-androstene-11β,17β-diol-3-one*

A solution of 0.1 g. of 16α-methyl-17α-ethinyl-9β,11β-oxido-4-androstene-17β-ol-3-one (obtained as in Example 1) in 5 ml. of alcohol-free chloroform is saturated with anhydrous hydrogen fluoride at 0° C. The mixture is allowed to stand for four hours at 0° C. and is then concentrated in vacuo to a residue. Crystallization of this residue from methanol-water yields 75 mg. of 9α-fluoro-16α-methyl-17α-ethinyl-4-androstene - 11β,17β - diol - 3-one.

EXAMPLE 9

*9α-fluoro-16α-methyl-17α-ethinyl-1,4-androstadiene-11β,17β-diol-3-one*

16α-methyl-17α-ethinyl-9β,11β-oxido - 1,4 - androstadiene-17β-ol-3-one (the compound of Example 5) is reacted with hydrogen fluoride in the manner of Example 8 to give 9α-fluoro-16α-methyl-17α-ethinyl-1,4-androstadiene-11β,17β-diol-3-one.

In similar fashion, 16β-methyl-17α-ethinyl-9β,11β-oxido-1,4-androstadiene-17β-ol-3-one, prepared as described in Example 5, when reacted with hydrogen fluoride yields 9α - fluoro - 16β - methyl - 17α-ethinyl-1,4-androstadiene-11β,17β-diol-3-one.

The dienes of this example are alternatively prepared by dehydrogenation of the A-ring. Thus, starting with the monoene of Example 1, namely, 16-methyl (α or β)-17α-ethinyl-9β,11β-oxido-4-androstene-17β-ol-3-one, and subjecting same to the microbiological dehydrogenating activity of *Corynebacterium simplex* according to the procedure described in U.S. Patent No. 2,837,464, there is obtained the diene of this example, 9α-fluoro-16α-methyl-17α-ethinyl-4-androstene-11β,17β-diol-3-one.

EXAMPLE 10

*9α-chloro-16α-methyl-17α-ethinyl-4-androstene-11β,17β-diol-3-one*

A solution of 0.2 g. of the 9β,11β-oxido compound of Example 1 in 10 ml. of alcohol-free chloroform is saturated with dry hydrogen chloride at 0° C. The mixture is maintained at 0° C. for four hours, then evaporated to a residue. Upon crystallization of this residue from acetone-hexane there is obtained 150 mg. of 9α-chloro-16α-methyl-17α-ethinyl-4-androstene - 11β,17β - diol - 3-one.

In similar fashion, by starting with the 16β-methyl epimer of the 9β,11β-oxido compound of Example 1, there is obtained 9α-chloro-16β-methyl-17α-ethinyl-4-androstene-11β,17β-diol-3-one.

EXAMPLE 11

*9α-bromo-16α-methyl-17α-ethinyl-4-androstene-11β,17β-diol-3-one*

A solution of the 16α-methyl-9β,11β-oxido compound of Example 1 in 5 ml. of alcohol-free chloroform is saturated with hydrogen bromide at 0° C. The mixture is maintained at this temperature for five hours and then evaporated to a residue. Upon crystallization of this residue from acetone-water, there is obtained 9α-bromo-16α-methyl-17α-ethinyl-4-androstene - 11β,17β - diol - 3-one.

In similar fashion, 16β-methyl-17α-ethinyl-9β,11β-oxido-4-androstene-17β-ol-3-one, prepared as in Example 1, is reacted with hydrogen bromide to obtain 9α-bromo-16β-methyl-17α-ethinyl-4-androstene - 11β,17β - diol - 3-one.

EXAMPLE 12

*9α-chloro-16α-methyl-17α-ethinyl-1,4-androstadiene-11β,17β-diol-3-one*

The 16α-methyl-oxido-diene of Example 5 is subjected to the action of hydrogen chloride according to the procedure of Example 10 to obtain 9α-chloro-16α-methyl-17α-ethinyl-1,4-androstadiene-11β,17β-diol-3-one.

Alternatively, the diene of this example may be prepared from the 9α-chloro-4-androstene of Example 10, by subjecting same to the microbiological dehydrogenating activity of *Corynebacterium simplex* as described in U.S. Patent No. 2,837,464.

In similar fashion, 16β-methyl-17α-ethinyl-9β,11β-oxido-1,4-androstadiene-17β-ol-3-one, prepared as described in Example 5, is reacted with hydrogen chloride according to the procedure of Example 10, to obtain 9α-chloro-16β-methyl-17α-ethinyl-1,4-androstadiene-11β,17β-diol-3-one.

EXAMPLE 13

*9α-bromo-16α-methyl-17α-ethinyl-1,4-androstadiene-11β,17β-diol-3-one*

By subjecting the oxido compound of Example 5 to the action of hydrogen bromide as described in Example 11, there is obtained 9α-bromo-16α-methyl-17α-ethinyl-1,4-androstadiene-11β,17β-diol-3-one.

Alternatively, the 9α-bromo-1,4-androstadiene of this example may be prepared by the action of *Corynebacterium simplex* on 9α-bromo-16α-methyl-17α-ethinyl-4-androstene-11β,17β-diol-3-one (compound of Example 11) by procedures analogous to those described in U.S. Patent No. 2,837,464.

EXAMPLE 14

*9α-fluoro-16α-methyl-17α-ethinyl-1,4-androstadiene-17β-ol-3,11-dione*

To 0.2 g. of 9α-fluoro-16α-methyl-17α-ethinyl-1,4-androstadiene-11β,17β-diol-3-one (the compound of Example 9) dissolved in 10 ml. of acetic acid, there is added dropwise a solution of 40 g. of chromium trioxide in 1 ml. of water and 3 ml. of acetic acid. The resulting mixture is allowed to stand 5 hours, then diluted with water and extracted with methylene chloride. The organic extracts are washed with water, dried over magnesium sulfate, filtered, and evaporated to a residue which is crystallized from methanol to give 9α-fluoro-16a-methyl-17α-ethinyl-1,4-androstadiene-17β-ol-3,11-dione.

Alternatively, the 9α-fluoro-11-keto-diene of this example is also prepared from 9α-fluoro-16α-methyl-17α-ethinyl-4-androstene-17β-ol-3,11-dione by microbiological dehydrogenation with *Corynebacterium simplex* by procedures analogous to those described in U.S. Patent No. 2,837,464. The 9α-fluoro-11-keto-4-androstene starting compound is prepared by subjecting the 9α-fluoro-11-hydroxy-4-androstene of Example 9 to chromic anhydride oxidation as described above.

Similarly, the other halohydrins, prepared as described heretofore, are convertible into the corresponding 9α-halo-11-keto-analogs by chromic anhydride oxidation. Thus, one is able to prepare 9α-chloro-16α-methyl-(or 16β-methyl)-17α-ethinyl-4-androstene-17β-ol-3,11 - dione, the corresponding 1,4-diene and the analogous 9α-bromo compounds.

EXAMPLE 15

*16α-n-butyl-17α-ethinyl-4-androstene-17β-ol-3,11-dione*

A. *16α-n-butyl-4-androstene-3,11,17 - trione.* — 16α-n-butylcortisone is oxidized with sodium bismuthate in the manner described in Example 2A to give 16α-n-butyl-4-androstene-3,11,17-trione.

B. *16α - n - butyl-17α-ethinyl-4-androstene-17β-ol-3,11-dione.*—The 16α-n-butyl androstene of Example 15A is reacted with acetylene in the manner of Example 2B to yield 16α-n-butyl-17α-ethinyl-4-androstene-17β - ol - 3,11-dione.

EXAMPLE 16

*16β-n-butyl-17α-ethinyl-4-androstene-17β-ol-3,11-dione*

16β-n-butylcortisone is oxidized with sodium bismuthate according to the procedure of Example 15A to give 16β-n-butyl-4-androstene-3,11,17-trione which is then reacted with acetylene in the manner of Example 15B to give 16β-n-butyl-17α-ethinyl-4-androstene-17β-ol-3,11-dione.

EXAMPLE 17

*16β-n-butyl-17α-ethinyl-1,4-androstadiene-17β-ol-3,11-dione*

The 16β-n-butyl-4-androstene of Example 16 is subjected to the action of *Corynebacterium simplex* according to procedures analogous to U.S. Patent No. 2,837,464 to give 16β-n-butyl-17α-ethinyl-1,4-androstadiene - 17β - ol-3,11-dione.

Alternatively, the 16β-n-butyl-1,4-androstadiene of this example may be obtained by subjecting 16β-n-butylcoritsone to the action of *Corynebacterium simplex* to obtain 16β-n-butylprednisone which, in turn, is oxidized with sodium bismuthate to the 16β-n-butyl-1,4-androstadiene-3,11,17-trione. This trione is then reacted with acetylene in the manner of Example 16 to give 16β-n-butyl-17α-ethinyl-1,4-androstadiene-17β-ol-3,11-dione.

EXAMPLE 18

*16α-n-butyl-17α-ethinyl-1,4-androstadiene-17β-ol-3,11-dione*

The 16α-n-butyl-4-androstene of Example 15 is subjected to the action of *Corynebacterium simplex* according to procedures analogous to U.S. Patent No. 2,837,464 to give 16α-n-butyl-17α-ethinyl-1,4-androstadiene - 17β - ol - 3,11-dione.

Alternatively, the 16α-n-butyl-1,4-androstadiene of this example may be obtained by subjecting 16α-n-butylcortisone to the action of *Corynebacterium simplex* to obtain 16α-n-butylprednisone which, in turn, is oxidized with sodium bismuthate to the 16α-n-butyl-1,4-androstadiene-3,11,17-trione. This trione is then reacted with acetylene in the manner of Example 15 to give 16α-n-butyl-17α-ethinyl-1,4-androstadiene-17β-ol-3,11-dione.

EXAMPLE 19

*16α-ethyl-17α-ethinyl-9β,11β-oxido-4-androstene-17β-ol-3-one*

16α-ethylhydrocortisone 21-acetate is subjected to the reaction sequence described in Example 1 to obtain 16α-ethyl - 17α - ethinyl-9β,11β-oxido-4-androstene-17β-ol-3-one.

In similar fashion, the 16β-ethyl epimer of the compound of this example may be prepared from 16β-ethylhydrocortisone 21-acetate which, in turn, is prepared from 16β-cortisone-3,20-bis-semicarbazone in the manner described in copending application, Serial No. 733,843 of Rausser et al., filed May 8, 1958.

EXAMPLE 20

*16α-ethyl-17α-ethinyl-9β,11β-oxido-1,4-androstadiene-17β-ol-3-one*

16α-ethylprednisolone is subjected to the reaction sequence of Example 1 to give 16α-ethyl-17α-ethinyl-9β,11β-oxido-1,4-androstadiene-17β-ol-3-one.

Alternatively, the compound of this example may be obtained from the 16α-ethyl-9β,11β-oxodo-4-androstene of Example 19 by the action of *Corynebacterium simplex* in the manner described in U.S. Patent No. 2,837,464.

EXAMPLE 21

*9α-fluoro-16α-ethyl-17α-ethinyl-4-androstene-11β,17β-diol-3-one*

16α - ethyl-17α-ethinyl-9β,11β-oxido-4-androstene-17β-ol-3-one, prepared as in Example 19, is reacted with hydrogen fluoride in the manner of Example 8 to give 9α - fluoro - 16α-ethyl-17α-ethinyl-4-androstene-11β,17β-diol-3-one.

In similar fashion, the 16β-epimer of the compound of this example may be prepared from 16β-ethyl-17α-ethinyl-9β,11β-oxido-4-androstene-17β-ol-3-one.

EXAMPLE 22

*9α-fluoro-16α-ethyl-17α-ethinyl-1,4-androstadiene-11β,17β-diol-3-one*

In the manner of Example 21, 16α-ethyl-17α-ethinyl-9β,11β-oxido - 1,4-androstadiene-17β-ol-3-one, is reacted with hydrogen fluoride to give 9α-fluoro-16α-ethyl-17α-ethinyl-1,4-androstadiene-11β,17β-diol-3-one.

Alternatively, the compound of this example may be obtained by subjecting the 9α-fluoro-16α-ethyl-4-androstene of Example 21 to the action of *Corynebacterium simplex* in the manner described in U.S. Patent No. 2,837,464.

In similar fashion, the 16β-ethyl epimer of the compound of this example may be obtained from 16β-ethyl-17α - ethinyl - 9β,11β-oxido-1,4-androstadiene-17β-ol-3-one and hydrogen fluoride.

By methods analogous to those described in above Examples 21 and 22, the 9α-bromo and 9α-chloro analogs of the compounds of the aforementioned examples may be obtained by substituting hydrobromic acid or hydrochloric acid respectively, for hydrofluoric acid in the described procedures.

EXAMPLE 23

*9α-fluoro-16α-ethyl-17α-ethinyl-4-androstene-17β-ol-3,11-dione*

9α - fluoro-16α-ethyl-17α-ethinyl-4-androstene-11β,17β-diol-3-one is oxidized with chromium trioxide in acetic acid in the manner of Example 14 to give 9α-fluoro-16α-ethyl-17α-ethinyl-4-androstene-17β-ol-3,11-dione.

EXAMPLE 24

*9α-fluoro-16α-ethyl-17α-ethinyl-1,4-androstadiene-17β-ol-3,11-dione*

The 9α-fluoro-16α-ethyl-4-androstene of Example 23 is subjected to the action of *Corynebacterium simplex* in the manner described in U.S. Patent No. 2,837,464 to give 9α - fluoro-16α-ethyl-17α-ethinyl-1,4-androstadiene-17β-ol-3,11-dione.

Alternatively, the compound of this example may be prepared by oxidizing 9α-fluoro-16α-ethyl-17α-ethinyl-1,4,-androstadiene - 11β,17β - diol-3-one with chromic anhydride in the manner described in Example 14.

EXAMPLE 25

*16α-methyl-17α-(1-propinyl)-9β,11β-oxido-4-androstene-17β-ol-3-one*

3 - pyrrolidino - 9β,11β-oxido-16α-methyl-3,5-androstadiene-17-one (the compound of Example 1F) is reacted with 1-propyne by a procedure analogous to Example 1G to give 16α-methyl-17α-(1-propinyl)-9β,11β-oxido-4-androstene-17β-ol-3-one.

In a similar fashion, 3-pyrrolidino-9β,11β-oxido-16β-methyl-3,5-androstadiene-17-one, prepared as in Example 1F, is converted to 16β-methyl-17α-(1-propinyl)-9β,11β-oxido-4-androstene-17β-ol-3-one.

EXAMPLE 26

*16α-methyl-17α-(1-propinyl)-9β,11β-oxido-1,4-androstadiene-17β-ol-3-one*

In the manner of Example 5, 3-pyrrolidino-9β,11β-oxido-16α-methyl-1,3,5-androstatriene-17-one (compound of Example 5F) is reacted with 1-propyne to give 16α-methyl - 17α - (1-propinyl) - 9β,11β-oxido-1,4-androstadiene-17β-ol-3-one.

Alternatively, the 16α-methyl-17α-propinyl-androstadiene of this example may be prepared from the corresponding 16α-methyl-17α-propinyl-4-androstene of Example 25 by the action of *Corynebacterium simplex* according to procedures in U.S. Patent No. 2,837,464.

Similarly, the 16β-methyl epimer of the compound of this example may be prepared from 3-pyrrolidino-9β,-11β - oxido-16β-methyl-1,3,5-androstatriene-17-one (prepared as in Example 5F) to give 16β-methyl-17α-(1-propinyl) - 9β,11β-oxido-1,4-androstadiene-17β-ol-3-one, or by the microbiological action of *Corynebacterium simplex* on the corresponding 16β-methyl-17α-(1-propinyl)-4-androstene.

By procedures analogous to those described in Examples 25 and 26, the 3-pyrrolidino-3,5-androstadiene of Example 1F and the 3-pyrrolidino-1,3,5-androstatriene of Example 5F may be reacted with homologs of acetylene such as for example, 1-butyne, 1-pentyne, 1-hexyne, and 1-butyne-3-methyl to obtain the 17α-(1-butinyl)-, 17α-(1 pentinyl)-, 17α-(1-hexinyl)- and 17α-(1-butinyl-3-methyl)- analogs of the 9β,11β-oxido compounds of Examples 25 and 26.

EXAMPLE 27

*16α-methyl-17α-(1-propinyl)-4-androstene-17β-ol-3,11-dione*

16α-methyl-4-androstene-3,11,17-trione, prepared as in Example 4, is reacted with 1-propyne by the procedure analogous to Example 1G to give 16α-methyl-17α-(1-propinyl)-4-androstene-17β-ol-3,11-dione.

In like manner, the 16β-methyl epimer of the compound of this example may be prepared from 16β-methyl-4-androstene-3,11,17-trione and 1-propyne.

EXAMPLE 28

*16α-methyl-17α-(1-propinyl)-1,4-androstadiene-17β-ol-3,11-dione*

16α - methyl-1,4-androstadiene-3,11,17-trione, prepared as in Example 7, is reacted with 1-propyne in the manner of Example 1G to give 16α-methyl-17α-(1-propinyl)-1,4-androstadiene-17β-ol-3,11-dione.

Alternatively, the 1,4-androstadiene of this example may be prepared from the 4-androstene of Example 27 by the action of a culture of *Corynebacterium simplex* by procedures analogous to those described in U.S. Patent No. 2,837,464.

The 16β-methyl epimer of the compound of this example may be made in a similar manner from 16β-methyl-1,4-androstadiene-3,11,17-trione prepared as in Example 7.

EXAMPLE 29

*9α-fluoro-16α-methyl-17α-(1-propinyl)-4-androstene-11β,17β-diol-3-one*

In the manner described in Example 8, the 9β,11β-oxido-16α-methyl-4-androstene of Example 27 is reacted with hydrogen fluoride to give 9α-fluoro-16α-methyl-17α-(1-propinyl)-4-androstene-11β,17β-diol-3-one.

In a similar manner, the 9α-bromo and 9α-chloro analogs of the compound of this example are prepared by substituting hydrobromic and hydrochloric acid, respectively, for hydrofluoric acid in the above procedure.

The 16β-methyl epimer of the compounds of this example are prepared from the corresponding 16β-methyl-9β,11β-oxido-4-androstene and a hydrogen halide.

EXAMPLE 30

*9α-fluoro-16α-ethyl-17α-(1-hexinyl)-1,4-androstadiene-11β,17β-diol-3-one*

A. *16α-ethyl-17α(1-hexinyl)9β-oxido-1,4-androstadiene-17β-ol-3-one.*—In the manner of Example 1G, 3-pyrrolidino-16α-ethyl-9β,11β-oxido-1,3,5-androstatriene-17-one, prepared as in Example 20, is reacted with 1-hexyne to give 16α-ethyl-17α-(1-hexinyl)-9β,11β-oxidio-1,4-androstadiene-17β-ol-3-one.

B. *9α-fluoro-16α-ethyl-17α-(1-hexinyl)-1,4-androstadiene-11β,17β-diol-3-one.*—In the manner of Example 29, the oxido compound of Example 30A is reacted with hydrogen fluoride to give 9α-fluoro-16α-ethyl-17α-(1-hexinyl)-1,4-androstadiene-11β,17β-diol-3-one.

We claim:

1. Androstenes having the formula:

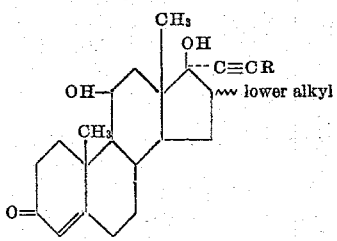

wherein R is lower alkyl.

2. A 9α-X-16-lower alkyl-17α-ethinyl-4-androstene-17β-ol-3,11-dione wherein X is a halogen of atomic weight less than 100.

3. Androstenes having the formula:

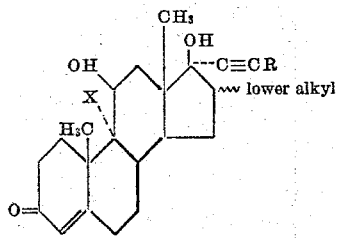

wherein X is a halogen of atomic weight less than 100; and R is lower alkyl.

4. Androstenes having the formula:

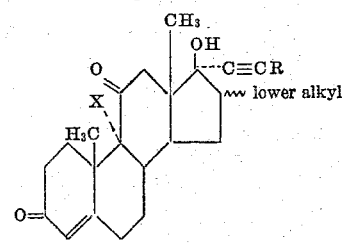

wherein X is a halogen of atomic weight less than 100; and R is lower alkyl.

5. Androstenes having the formula:

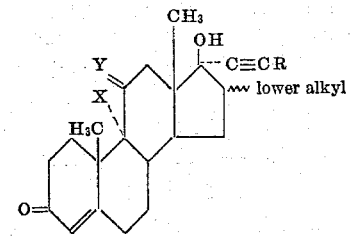

wherein X is halogen; Y is a member of the group consisting of O and (H, βOH); and R is lower alkyl.

6. Androstenes having the following formula:

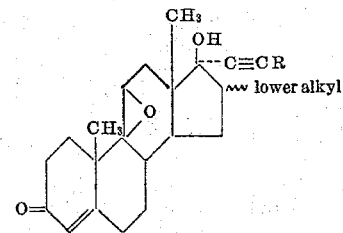

wherein R is lower alkyl.

References Cited in the file of this patent

UNITED STATES PATENTS

| | | |
|---|---|---|
| 2,588,391 | Julian et al. | Mar. 11, 1952 |
| 2,793,217 | Muller | May 21, 1957 |
| 2,816,121 | Gould et al. | Dec. 10, 1957 |
| 2,837,464 | Nobile | June 3, 1958 |

UNITED STATES PATENT OFFICE
CERTIFICATE OF CORRECTION

Patent No. 3,010,959            November 28, 1961

Eugene P. Oliveto et al.

It is hereby certified that error appears in the above numbered patent requiring correction and that the said Letters Patent should read as corrected below.

Column 1, lines 17 to 26, the structural formula should appear as shown below instead of as in the patent:

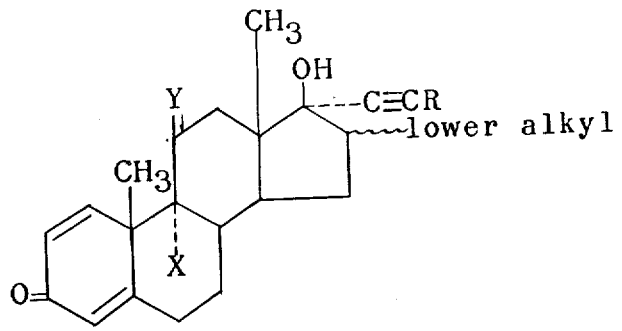

column 11, line 38, for "90α-X-" read -- 9α-X- --.

Signed and sealed this 24th day of April 1962.

(SEAL)
Attest:

ESTON G. JOHNSON
Attesting Officer

DAVID L. LADD
Commissioner of Patents